US008949600B2

(12) United States Patent
Paddon et al.

(10) Patent No.: US 8,949,600 B2
(45) Date of Patent: Feb. 3, 2015

(54) COMPOSED MESSAGE AUTHENTICATION CODE

(75) Inventors: Michael Paddon, Tokyo (JP); Adrian Escott, Reading (GB); Gregory G. Rose, San Diego, CA (US); Philip Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 1310 days.

(21) Appl. No.: 11/681,117

(22) Filed: Mar. 1, 2007

(65) Prior Publication Data

US 2008/0104397 A1 May 1, 2008

Related U.S. Application Data

(60) Provisional application No. 60/863,217, filed on Oct. 27, 2006.

(51) Int. Cl.
*H04L 29/06* (2006.01)
*H04L 9/32* (2006.01)
*H04W 12/10* (2009.01)

(52) U.S. Cl.
CPC ............ *H04L 63/123* (2013.01); *H04L 9/3242* (2013.01); *H04W 12/10* (2013.01); *H04L 2209/60* (2013.01)
USPC .............................. 713/168; 713/161; 380/37

(58) Field of Classification Search
USPC ............................ 713/161, 168, 170; 380/37
See application file for complete search history.

(56) References Cited

U.S. PATENT DOCUMENTS 5,844,918 A * 12/1998 Kato ............................ 714/751
6,963,976 B1 * 11/2005 Jutla ............................ 713/181

(Continued)

FOREIGN PATENT DOCUMENTS

AU 723002 * 12/1998 ................ H04L 9/32
JP 9312642 A 12/1997

(Continued)

OTHER PUBLICATIONS

International Search Report—PCT/US07/082566, International Search Authority—European Patent Office—May 29, 2008.

(Continued)

*Primary Examiner* — Vikkram Bali
*Assistant Examiner* — Tracy Mangialaschi
(74) *Attorney, Agent, or Firm* — Kim Won Tae; Thomas A. Jolly

(57) ABSTRACT

Prior to transmission, a message is divided into multiple transmission units. A sub-message authentication code is obtained for each of the transmission units. A composed message authentication code is obtained for the whole message based on the sub-message authentication codes of the multiple transmission units. The multiple transmission units and the composed message authentication code are then transmitted. A receiver of the message receives a plurality of transmission units corresponding to the message. A local sub-message authentication code is calculated by the receiver for each transmission unit. A local composed message authentication code is calculated by the receiver based on the local sub-message authentication codes for the plurality of transmission units. The local composed message authentication code is compared to a received composed message authentication code to determine the integrity and/or authenticity of the received message.

34 Claims, 6 Drawing Sheets

202
Message 204 206 208
Transmission Unit A | Transmission Unit B | Transmission Unit N 204 206 208
Transmission Unit A | Transmission Unit B | Transmission Unit N
$SMAC_A$ $SMAC_B$ $SMAC_N$ $CMAC_{A...N}$

(56) References Cited

U.S. PATENT DOCUMENTS

| | | | | |
|---|---|---|---|---|
| 7,032,224 | B2 | 4/2006 | Kadakia et al. | |
| 7,043,677 | B1 * | 5/2006 | Li | 714/758 |
| 2003/0126303 | A1 * | 7/2003 | Kadakia et al. | 709/313 |
| 2004/0142710 | A1 | 7/2004 | Liang | |
| 2004/0158793 | A1 * | 8/2004 | Blightman et al. | 714/758 |
| 2004/0255123 | A1 | 12/2004 | Noyama et al. | |
| 2005/0097361 | A1 * | 5/2005 | Apostolopoulos et al. | 713/201 |
| 2005/0157715 | A1 * | 7/2005 | Hiddink et al. | 370/389 |
| 2005/0265353 | A1 * | 12/2005 | Sengupta et al. | 370/395.52 |
| 2007/0255947 | A1 * | 11/2007 | Choudhury et al. | 713/161 |

FOREIGN PATENT DOCUMENTS

| | | | | |
|---|---|---|---|---|
| JP | 10079732 | A | 3/1998 | |
| JP | 2000513115 | A | 10/2000 | |
| JP | 2001251296 | A | 9/2001 | |
| JP | 2001519930 | A | 10/2001 | |
| JP | 2003022007 | A | 1/2003 | |
| JP | 2004260639 | A | 9/2004 | |
| JP | 2004364022 | A | 12/2004 | |
| JP | 2005012466 | A | 1/2005 | |
| JP | 2006039206 | A | 2/2006 | |
| JP | 2006134013 | A | 5/2006 | |
| WO | 9847264 | | 10/1998 | |
| WO | WO-9940702 | A1 | 8/1999 | |
| WO | WO 02/073928 | * | 9/2002 | H04L 29/06 |
| WO | 2006086554 | | 8/2006 | |

OTHER PUBLICATIONS

Written Opinion—PCT/US07/082566, International Search Authority—European Patent Office—May 29, 2008.

* cited by examiner

COMPOSED MESSAGE AUTHENTICATION CODE

CLAIM OF PRIORITY UNDER 35 U.S.C. §119

The present Application for Patent claims priority to U.S. Provisional Application No. 60/863,217 entitled "Composed Message Authentication Code" filed Oct. 27, 2006, and assigned to the assignee hereof and hereby expressly incorporated by reference herein.

BACKGROUND

1. Field

Various configurations pertain to communications and, in particular, to a method for authenticating messages.

2. Background

A message authentication code (MAC) is a short piece of information accompanying or embedded within a transmitted message, and is a common feature of many communication protocols. The purpose of a MAC is to protect both a message's integrity as well as its authenticity by allowing verifiers (who also possess the secret key) to detect any changes to the message and/or the MAC. A typical MAC algorithm accepts as input a secret key and an arbitrary-length message and calculates the resulting MAC. When a message is received, its MAC is calculated by the receiver and checked against the transmitted MAC. If the two MAC match, the message is processed, otherwise the message is (typically) discarded.

A message may be broken into transmission units (TUs) when in transit. This typically occurs when the maximum transmission unit (MTU) of a communication link is smaller than the length of the original message. In some circumstances, the component TUs of a message may arrive out of order at the receiver.

Typically, an entire message has be present in order to complete the calculation of a conventional MAC. If the message has been broken into TUs, it has to first be reassembled by the receiver before a MAC can be calculated. For instance, a data packet that has been decomposed into transmission units or fragments by a router, or into frames by a link layer, has to be reassembled before its MAC can be calculated.

A MAC calculation is a relatively expensive and time consuming process. It is therefore desirable to begin MAC calculations on a message as soon as possible in order to minimize latency and maximize throughput. It is often also desirable to relegate such calculations to specialized hardware.

A conventional MAC is calculated over the entire message by processing it from start to end. If the message has been broken into multiple transmission units (TUs) (e.g., packets, segments, etc.), and the TUs arrive out of order, then the receiver will possess some TUs over which no MAC calculations can be performed until further TUs arrive. In a worst case scenario, a receiver may have most of the message but is unable to initiate any MAC calculations because one or a few TUs for the message have not been received. If TUs could be processed independently in order to calculate the MAC, then significant efficiencies may be gained.

Furthermore, in the case where TUs may arrive out of order, the receiving hardware typically passes the TUs to general purpose processing elements for reassembly and MAC calculation. If TUs could be processed independently (e.g., out of sequence and/or without waiting for all TUs for a particular message to arrive), then these calculations could be implemented directly in the receiving hardware.

SUMMARY

A method for operational on a sender device is provided for performing integrity verification and authentication of a message. Prior to transmission, the message is divided into multiple transmission units. A sub-message authentication code is obtained for each of the transmission units. A composed message authentication code is obtained for the whole message based on the sub-message authentication codes of the multiple transmission units. The multiple transmission units and the composed message authentication code are then transmitted. The composed authentication code may be appended to one of the multiple transmission units prior to transmission. The composed message authentication code may be a function of the sub-message authentication codes of the multiple transmission units. For example, the composed message authentication code may be derived by (1) performing exclusive-OR operations on the sub-message authentication codes; (2) obtained from a function that composes multiple fixed length inputs into a single fixed length output, (3) obtained by a function that adds together the sub-message authentication codes and/or (4) obtained by a function that calculates a polynomial with the sub-message authentication codes acting as coefficients. The sub-message authentication code may be based on the content of the corresponding transmission unit.

A transmission device is also provided comprising a transmitter circuit configured to (1) divide a message into multiple transmission units, (2) obtain a sub-message authentication code for each of the transmission units, (3) obtain a composed message authentication code for the whole message based on the sub-message authentication codes of the multiple transmission units, (4) append the to composed authentication code to one of the multiple transmission units, and/or (5) transmit the multiple transmission units and the composed message authentication code. The sub-message authentication code may be based on the content of the corresponding transmission unit.

Yet another configuration provides a transmission device, comprising (1) means for dividing a message into multiple transmission units, (2) means for obtaining a sub-message authentication code for each of the transmission units, (3) means for obtaining a composed message authentication code for the whole message based on the sub-message authentication codes of the multiple transmission units, (4) means for appending the composed authentication code to one of the multiple transmission units, and/or (5) means for transmitting the multiple transmission units and the composed message authentication code.

A processing device is also provided comprising (1) an input interface for receiving unprocessed messages, and (2) a processing circuit. The processing circuit may be configured to (a) divide a received unprocessed message into multiple transmission units, (b) obtain a sub-message authentication code for each of the transmission units, (c) obtain a composed message authentication code for the whole message based on the sub-message authentication codes of the multiple transmission units, (d) append the to composed authentication code to one of the multiple transmission units, and/or (e) transmit the multiple transmission units and the composed message authentication code.

A machine-readable medium is also provided having one or more instructions for authenticating messages at a sender device, which when executed by a processor causes the processor to (1) divide a received message into multiple transmission units, (2) obtain a sub-message authentication code for each of the transmission units, (3) obtain a composed message authentication code for the whole message based on the sub-message authentication codes of the multiple transmission units, (4) append the to composed authentication code to one of the multiple transmission units, and/or (5) transmit the multiple transmission units and the composed message authentication code.

A method operational on a receiving device is provided for performing integrity verification and authentication of a received message. A plurality of transmission units corresponding to the message is obtained. A local sub-message authentication code is calculated for each transmission unit, A local composed message authentication code is calculated based on the local sub-message authentication codes for the plurality of transmission units. The local composed message authentication code is compared to a received composed message authentication code to determine the integrity and/or authenticity of the associated message. The local sub-message authentication code may be calculated as its associated transmission unit arrives. The transmission units may arrive out of order and are buffered as they are obtained. The transmission units may be provided to other devices if the local and received composed message authentication codes are the same. Otherwise, the transmission units are discarded if the local and received composed message authentication codes are different.

A receiving device is provided, comprising of a receiver circuit configured to (1) obtain a plurality of transmission units corresponding to a message, (2) calculate a local sub-message authentication code for each transmission unit, (3) calculate a composed message authentication code based on the local sub-message authentication codes for the plurality of transmission units, (4) compare the local composed message authentication code to a received composed message authentication code to determine the integrity and/or authenticity of the associated message, (5) provide the transmission units to other devices if the local and received composed message authentication codes are the same, and/or (6) discard the transmission units if the local and received composed message authentication codes are different.

A receiver device is provided, comprising (1) means for obtaining a plurality of transmission units corresponding to a message, (2) means for calculating a local sub-message authentication code for each transmission unit, (3) means for calculating a composed message authentication code based on the local sub-message authentication codes for the plurality of transmission units, (4) means for comparing the local composed message authentication code to a received composed message authentication code to determine the integrity and/or authenticity of the associated message, (5) means for providing the transmission units to other devices if the local and received composed message authentication codes are the same, and/or (6) means for discarding the message if the local and received message authentication codes are different.

A processing device is also provided comprising (1) an input interface for receiving a plurality of transmission units corresponding to a message and (2) a processing circuit. The processing circuit may be configured to (a) calculate a local sub-message authentication code for each transmission unit, (b) calculate a composed message authentication code based on the local sub-message authentication codes for the plurality of transmission units, (c) compare the local composed message authentication code to a received composed message authentication code to determine the integrity and/or authenticity of the message, (d) provide the transmission units to other devices if the local and received composed message authentication codes are the same, and/or (e) discard the transmission units if the local and received composed message authentication codes are different.

A machine-readable medium is provided having one or more instructions for authenticating messages on a receiving device, which when executed by a processor causes the processor to (1) obtain a plurality of transmission units corresponding to a message, (2) calculate a local sub-message authentication code for each transmission unit, (3) calculate a composed message authentication code based on the local sub-message authentication codes for the plurality of transmission units, (4) compare the local composed message authentication code to a received composed message authentication code to determine the integrity and/or authenticity of the associated message, (5) provide the transmission units to other devices if the local and received composed message authentication codes are the same, and/or (6) discard the transmission units if the local and received composed message authentication codes are different.

DETAILED DESCRIPTION

Figure 1:
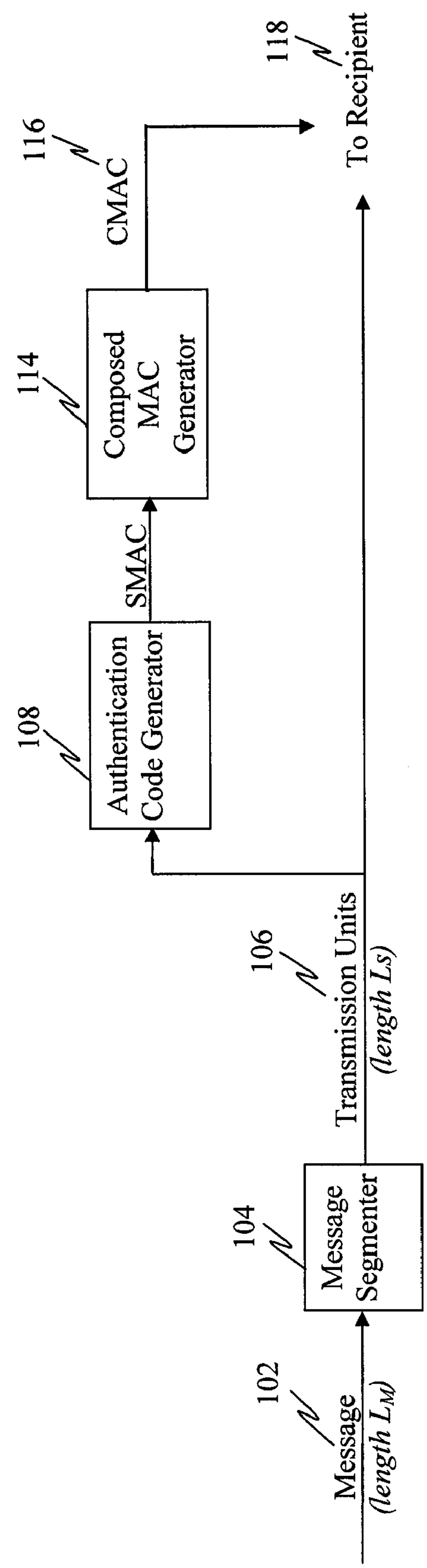
FIG. 1 is a block diagram illustrating functional, logical, software, and/or hardware components of a sender device implementing a composed message authentication code scheme according to one example.

In the following description, specific details are given to provide a thorough understanding of the examples and configurations. However, it will be understood by one of ordinary skill in the art that the examples and configurations may be practiced without these specific details. For example, circuits may not be shown in block diagrams in order not to obscure the examples and configurations in unnecessary detail.

Also, it is noted that the examples and configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, configurations may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

In the following description, certain terminology is used to describe certain features of one or more examples. The term "message authentication code" refers to any piece of information accompanying or embedded within a transmitted message that can serve to protect both the message's integrity as well as its authenticity.

One novel feature provides a composed message authentication code (CMAC) in which sub-message authentication codes (SMACs) are independently calculated over each TU. The SMACs are then composed into a CMAC which covers the entire message.

FIG. 1 is a block diagram illustrating functional, logical, software, and/or hardware components of a sender device implementing a composed message authentication code scheme according to one example. A message 102 of length LM is obtained. Rather than computing a MAC for the whole message (as may be done by conventional systems), a message segmenter 104 divides the message into a plurality of transmission units (TUs). The TUs may be of equal or different lengths LS, where LS<LM. An authentication code generator 108 then generates a sub-message authentication code (SMAC) for each of the TUs. The SMAC for each of the TUs are sent to a composed MAC generator 114 that combines them to form a composed message authentication code (CMAC) 116. The transmission units 106 are transmitted to a recipient 118. The CMAC 116 is also transmitted to the recipient 118. For instance, the CMAC 116 may be appended to the last TU to be transmitted to the recipient 118.

In yet another implementation, both the SMACs for a message and a CMAC for the message are sent to a recipient to verify the integrity and/or authenticity of the message.

Figure 2:
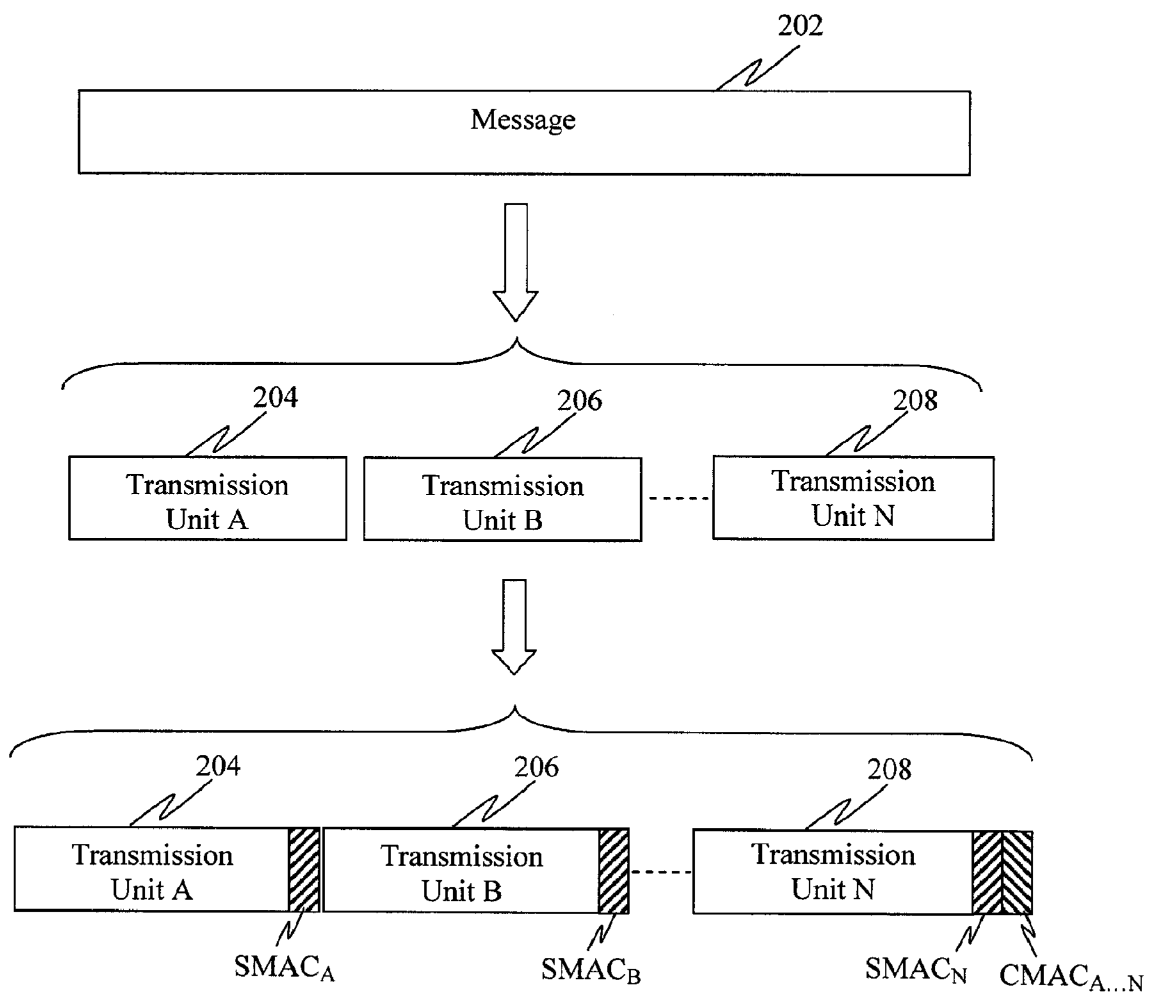
FIG. 2 is a block diagram illustrating the processing of a message to implement a composed message authentication code scheme according to one example.

FIG. 2 is a block diagram illustrating the processing of a message to implement a composed message authentication code scheme according to one example. A message 202 is divided, segmented, or otherwise partitioned into a plurality of smaller length transmission units (TU) A 204, B 206, through N 208. For each TU, a sub-message authentication code (SMAC) is obtained. The SMAC may be a value calculated based on the data or information in the associated TU. For example, SMACA may be calculated from the information in TU A 204.

In one implementation, a CMAC may be obtained based on all of the SMACs for a particular message. For example, value $CMAC_A$ . . . N may be obtained based on the SMACs for TU's A 204, B 206, through N 208 (i.e., $SMAC_A$, $SMAC_B$, through $SMAC_N$). The $CMAC_A$ . . . N may be transmitted to a recipient that uses it to verify the integrity and/or authenticity of the overall message.

In some implementations, the SMAC may be appended to its corresponding TU for transmission. This way, as a TU is received, the recipient may verify its integrity and/or authenticity based on its attached SMAC.

By transmitting smaller size TUs having their own SMAC, this allows a recipient to pre-process each TU as it is received, thereby reducing the delay of verifying or authenticating a particular message. While in the prior art a complete message is typically received before its MAC can be calculated, the present feature calculates a SMAC for each segment or TU of a message as it is received. When the last segment or TU is received, the recipient merely calculates the CMAC for the received message based on the previously calculated SMACs. Calculating the CMAC is less time consuming than calculating the MAC over the whole message. This is because a CMAC uses pre-calculated codes (SMACs) instead of having to parse the whole message once all parts have been received.

The SMACs need not be appended to each TU for transmission. Instead, the SMACs are used (internally) by the transmitting device to generate a CMAC that is transmitted to a recipient along with the TUs. The CMAC may be transmitted separately or appended to a TU. The recipient may then verify the integrity and/or authenticity of the message by calculating its own SMACs (as each TU is received) to generate a local CMAC that can then be compared to the received CMAC.

The CMAC for a message is calculated as a function of the SMACs for the associated TUs of the message. That is, for a message M have N transmission units, the CMAC is represented as:

$$CMAC(M)=F(SMAC(TU_0),SMAC(TU_1), \ldots SMAC(TU_{N-1})),$$

where F is a function which composes multiple fixed length inputs (e.g., SMACs) into a single fixed length output (e.g., CMAC). One implementation of function F may be a function that calculates the exclusive-or of all of its inputs (SMACs). Another implementation provides a function F that adds together all of its inputs (SMACs) modulo the desired output length (CMAC). Yet another implementation provides a function that calculates a polynomial with the inputs (SMACs) acting as coefficients. These are just some example of functions that may be used to calculate a CMAC based on a plurality of SMACs. Other types of functions F are also encompassed by the present scheme.

Figure 3:
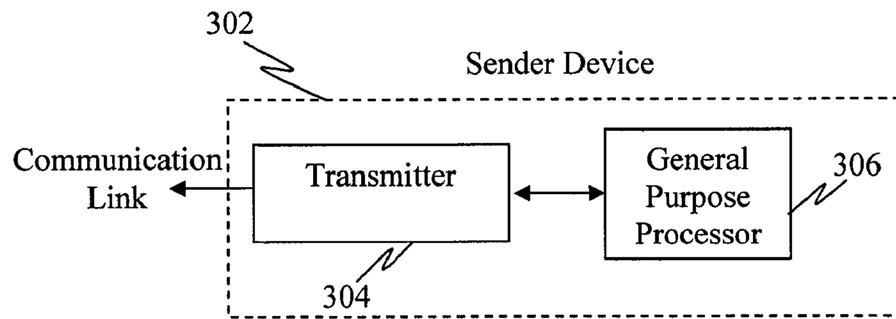
FIG. 3 is a block diagram illustrating an example of a sender device implementing a composed message authentication code scheme.

FIG. 3 is a block diagram illustrating an example of a sender device implementing a composed message authentication code scheme. The sender device 302 may include a transmitter 304 and a general purpose processor 306. The transmitter 304 allows the sender device 302 to transmit information (e.g., messages) over a communication link. According to one implementation, transmitter 304 may include hardware and/or software components configured to partition a message into multiple TUs, obtain an SMAC for each TU, obtain a CMAC for the message based on the SMACs, and transmit the TUs and CMAC. For instance, the transmitter 304 hardware may implement the operations and functions illustrated in FIGS. 1 and/or 2. By implementing these operations and functions on the transmitter 304 hardware, the processing burden on the general purpose processor 306 is reduced.

Figure 4:
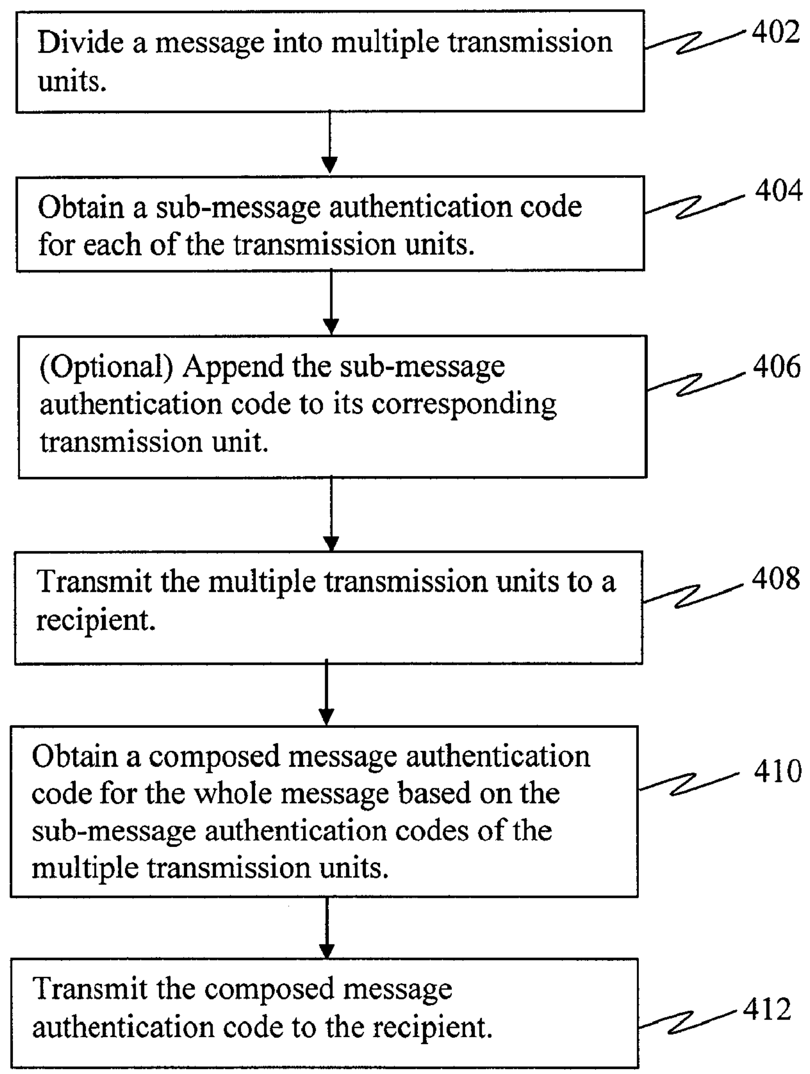
FIG. 4 illustrates a method operational on a sender device for implementing a composed message authentication code scheme.

FIG. 4 illustrates a method operational on a sender device for implementing a composed message authentication code scheme. A message is divided into multiple transmission units (TUs) 402. A sub-message authentication code (SMAC) is obtained for each of the transmission units 404. In one implementation, the SMAC may be appended to its corresponding TU 406. The multiple TUs are transmitted to a recipient 408. The recipient may then verify the integrity and/or authenticity of a message by calculating local SMACs for each received TU and comparing the local SMAC to the SMAC received with each TU.

The SMACs need not be appended and/or transmitted with each TU. Instead, a composed message authentication code (CMAC) may be obtained for the whole message based on the SMACs of the transmission units 410. The SMACs are used internally by a transmitter device to calculate the CMAC. This CMAC is transmitted to the recipient 412. For instance, the CMAC may be appended to the last TU and then transmitted. The recipient can then verify the integrity and/or authenticity of a message by calculating local SMACs for each received TU, calculating a local CMAC based on the local SMACs, and comparing the local CMAC to the received CMAC.

Figure 5:
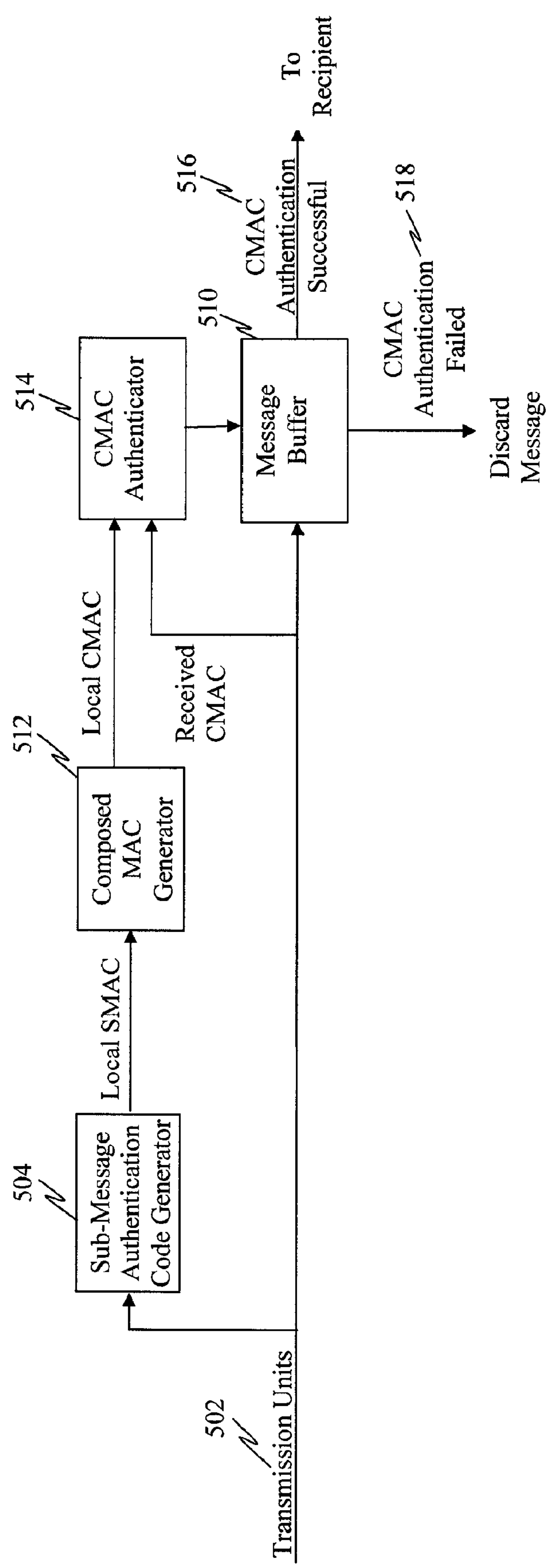
FIG. 5 is a block diagram illustrating functional, logical, software, and/or hardware components of a receiver device implementing a composed message authentication code scheme according to one example.

FIG. 5 is a block diagram illustrating functional, logical, software, and/or hardware components of a receiver device implementing a composed message authentication code scheme according to one example. Multiple message transmission units (TUs) 502 are received. As each TU is received, a sub-message authentication code generator 504 generates a SMAC based on the content of the TU. That is, generator 504 generates its own local SMAC based on the payload or information in the TU. A composed MAC generator 512 obtains the local SMACs for the received TU and, once all TUs have been received, it calculates a local CMAC based on the local SMACs. A CMAC authenticator 514 then compares the local CMAC and a received CMAC (typically appended to the last transmitted TU) to determine the integrity and/or authenticity of the overall message. If the local CMAC and received CMAC are the same, CMAC authentication is successful 516 and the TUs making up the received message are passed from a message buffer 510 upstream to other components of the receiver device. Otherwise, if the local CMAC and received CMAC are not the same, authentication has failed 518 and the TUs for the message may be discarded.

Figure 6:
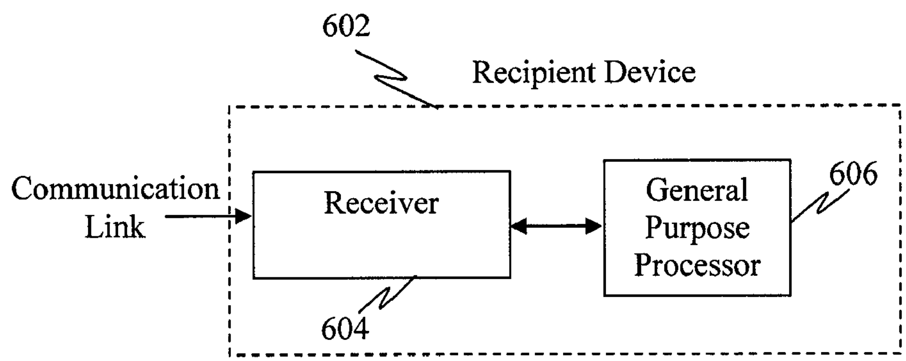
FIG. 6 is a block diagram illustrating an example of a receiver device implementing a composed message authentication code scheme.

FIG. 6 is a block diagram illustrating an example of a receiver device implementing a composed message authentication code scheme. The receiver device 602 may include a receiver 604 and a general purpose processor 606. The receiver 604 allows the receiver device 602 to receive information (e.g., messages) over a communication link. According to one implementation, receiver 604 may include hardware and/or software components configured to receive a plurality of TUs, obtain a local SMAC for each TU and obtain a local CMAC based on the local SMACs, and compare the local SMAC/CMAC to a received SMAC/CMAC to determine the received message's integrity and/or authenticity. For instance, the receiver 604 hardware may implement the operations and functions illustrated in FIG. 5. By implementing these operations and functions on the receiver 604 hardware, the processing burden on the general purpose processor 606 is reduced.

Figure 7:
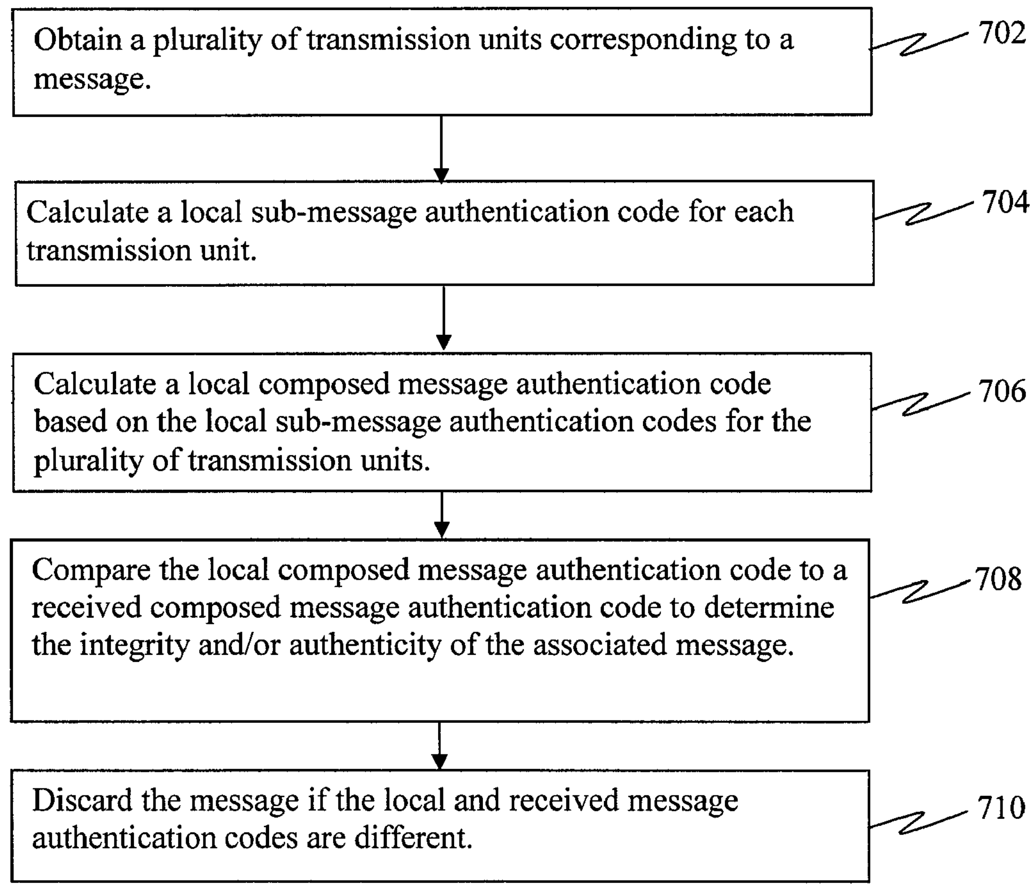
FIG. 7 illustrates a method operational on a receiver device for implementing a composed message authentication code scheme.

FIG. 7 illustrates a method operational on a receiver device for implementing a composed message authentication code scheme. A plurality of transmission units corresponding to a message are obtained 702. These transmission units may be received out of order and they may be of different sizes. A local sub-message authentication code (SMAC) for each transmission unit is calculated or obtained 704. The local sub-message authentication code (SMAC) for each transmission unit may be calculated as each transmission unit is received, even if the transmission units are received out of order or sequence. A local composed message authentication code (CMAC.sub.Local) is calculated or obtained based on the local sub-message authentication codes (SMACs) for the plurality of transmission units 706. The local composed message authentication code (CMAC.sub.Local) is compared to a received composed message authentication code (CMAC.sub.Received) for a transmission unit to determine the integrity and/or authenticity of the associated message 708. The message is discarded if the local and received message authenticity codes are different 710.

Figure 8:
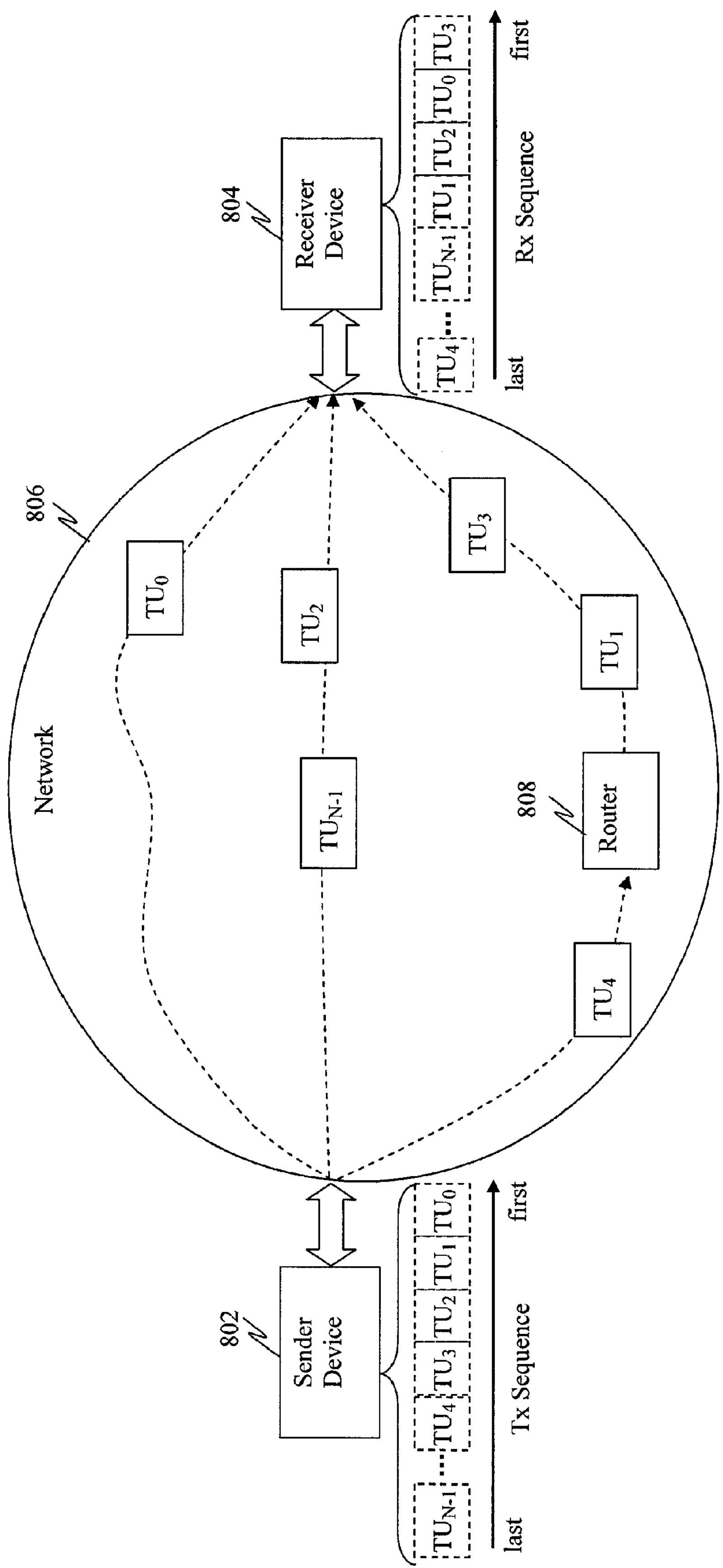
FIG. 8 is a block diagram illustrating a network view of how a message may be transmitted from a sender device to a receiver device according to one example.

FIG. 8 is a block diagram illustrating a network view of how a message may be transmitted from a sender device to a receiver device according to one example. A sender device 802 divides or segments a message into multiple transmission units $TU_0$, $TU_1$, $TU_2$, $TU_3$, $TU_4$, $TU_{N-1}$ (where N is an integer) and transmits them to a receiver device 804 over a network 806, such as the Internet or a wireless communication network for example. Prior to transmission, the sender device 802 calculates an SMAC for each TU and also calculates a CMAC for the message based on the SMACs. The CMAC is appended to one of the TUs. The sender device 802 may transmit the TUs in sequence or out of sequence. However, when going through the network 806, the TUs may take difference transmission paths and arrive out of sequence. For instance, some TUs may be delayed by a router 808 or other network devices causing them to arrive after later transmitted TUs.

The receiver device 802 may receive the TUs out of sequence ($TU_3$, $TU_0$, $TU_2$, $TU_1$, $TU_{N-1}$, $TU_4$). A SMAC is calculated by the receiver device 804 for each TU as it is received. Once the final TU is received, a local CMAC is calculated by the receiver device 804. This local CMAC is compared to the CMAC transmitted by the sender device 802 to determine integrity and/or authenticity of the message. If the local CMAC matches the transmitted CMAC, the message integrity has been verified and it is considered authentic. If the local CMAC and received CMAC do not match, then the message may be discarded.

In various implementations, the sender device 802 and/or receiver device 804 may be wireless telephones, base stations, access points, computer servers, network routers, and/or other communication devices that communicate over a wired and/or wireless network.

One or more of the components, steps, and/or functions illustrated in FIGS. 1-8 may be rearranged and/or combined into a single component, step, or function or embodied in several components, steps, or functions without departing from the invention. Additional elements, components, steps, and/or functions may also be added without departing from the invention. The apparatus, devices, and/or components illustrated in FIGS. 1, 3, 5, 6 and/or 8 may be configured to perform one or more of the methods, features, or steps described in FIGS. 2, 4, and/or 7.

Those of skill would further appreciate that the various illustrative logical blocks, modules, circuits, and algorithm steps described in connection with the examples and configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing examples and configurations are merely examples and are not to be construed as limiting the invention. The description of the examples and configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a sender device for performing integrity verification and authentication of a message, comprising:

dividing the message into multiple transmission units;

obtaining a sub-message authentication code for each of the transmission units, wherein the sub-message authentication code for each of the multiple transmission units is based on a content of a corresponding transmission unit;

obtaining a composed message authentication code for the whole message based on the sub-message authentication codes of the multiple transmission units;

appending the sub-message authentication code for each of the multiple transmission units to the respective transmission unit;

appending the composed message authentication code for the whole message to one of the multiple transmission units prior to transmission over a network; and separately transmitting each of the multiple transmission units, wherein the separately transmitted multiple transmission units each have the sub-message authentication code for the respective transmission unit appended thereto and the one transmission unit further has the composed message authentication code for the whole message appended thereto.

2. The method of claim 1 wherein the composed message authentication code is a function of the sub-message authentication codes of the multiple transmission units only.

3. The method of claim 1 wherein the composed message authentication code is derived by performing exclusive-OR operations on the sub-message authentication codes.

4. The method of claim 1 wherein the composed message authentication code is obtained from a function that composes multiple fixed length inputs into a single fixed length output.

5. The method of claim 1 wherein the composed message authentication code is obtained by a function that adds together the sub-message authentication codes.

6. The method of claim 1 wherein the composed message authentication code is obtained by a function that calculates a polynomial with the sub-message authentication codes acting as coefficients.

7. The method of claim 1 wherein the transmission units have different lengths.

8. The method of claim 1 wherein the multiple transmission units have equal lengths.

9. The method of claim 1 wherein the one transmission unit having the composed message authentication code appended thereto comprises a last transmission unit among the separately transmitted multiple transmission units.

10. The method of claim 1 wherein the multiple transmission units are transmitted over the network out of sequence.

11. The method of claim 1 wherein the message is divided into the multiple transmission units prior to transmission over the network.

12. A transmission device, comprising a transmitter circuit configured to:

divide a message into multiple transmission units;

obtain a sub-message authentication code for each of the transmission units, wherein the sub-message authentication code for each of the multiple transmission units is based on a content of a corresponding transmission unit;

obtain a composed message authentication code for the whole message based On the sub-message authentication codes of the multiple transmission units;

append the sub-message code for each of the multiple transmission units to the respective transmission unit;

append the composed message authentication code for the whole message to one of the multiple transmission units prior to transmission over a network; and separately transmit each of the multiple transmission units, wherein the separately transmitted multiple transmission units each have the sub-message authentication code for the respective transmission unit appended thereto and the one transmission unit further has the composed message authentication code for the whole message appended thereto.

13. The device of claim 12, wherein the transmitter includes a function that composes multiple fixed length inputs into a single fixed length output.

14. A transmission device, comprising:

means for dividing a message into multiple transmission units;

means for obtaining a sub-message authentication code for each of the multiple transmission units, wherein the sub-message authentication code for each of the multiple transmission units is based on a content of a corresponding transmission unit;

means for obtaining a composed message authentication code for the whole message based on the sub-message authentication codes of the multiple transmission units;

means for appending the sub-message authentication code for each of the multiple transmission units to the respective transmission unit;

means for appending the composed message authentication code for the whole message to one of the multiple transmission units prior to transmission over a network; and means for separately transmitting each of the multiple transmission units, wherein the separately transmitted multiple transmission units each have the sub-message authentication code for the respective transmission unit appended thereto and the one transmission unit further has the composed message authentication code for the whole message appended thereto.

15. The transmission device of claim 14 wherein each of the sub-message authentication codes has fewer bits than its corresponding transmission unit.

16. The transmission device of claim 14 wherein each of the sub-message authentication codes is a function of its corresponding transmission unit only.

17. The transmission device of claim 16 wherein the composed message authentication code is a function of the sub-message authentication codes only.

18. A processing device comprising:

an input interface for receiving unprocessed messages; and a processing circuit configured to:

divide a received unprocessed message into multiple transmission units;

obtain a sub-message authentication code for each of the multiple transmission units, wherein the sub-message authentication code for each of the multiple transmission units is based on a content of a corresponding transmission unit;

obtain a composed message authentication code for the whole message based on the sub-message authentication codes of the multiple transmission units;

append the sub-message authentication code for each of the multiple transmission units to the respective transmission unit;

append the composed message authentication code for the whole message to one of the multiple transmission units prior to transmission over a network; and separately transmit each of the multiple transmission units, wherein the separately transmitted multiple transmission units each have the sub-message authentication code for the respective transmission unit appended thereto and the one transmission unit further has the composed message authentication code for the whole message appended thereto.

19. The device of claim 18, wherein the transmitter includes a function that composes multiple fixed length inputs into a single fixed length output.

20. A non-transitory machine-readable medium having one or more instructions for authenticating messages on a sender device, which when executed by a processor causes the processor to:

divide a received message into multiple transmission units;

obtain a sub-message authentication code for each of the transmission units, wherein the sub-message authentication code for each of the multiple transmission units is based on a content of a corresponding transmission unit;

obtain a composed message authentication code for the whole message based on the sub-message authentication codes of the multiple transmission units;

append the sub-message authentication code for each of the multiple transmission units to the respective transmission unit;

append the composed message authentication code for the whole message to one of the multiple transmission units prior to transmission over a network; and separately transmit each of the multiple transmission units, wherein the separately transmitted multiple transmission units each have the sub-message authentication code for the respective transmission unit appended thereto and the one transmission unit further has the composed message authentication code for the whole message appended thereto.

21. A method for operational on a receiving device for performing integrity verification and authentication of a received message, comprising:

obtaining a plurality of transmission units corresponding to the message, wherein each of the plurality of separate transmission units has a sub-message authentication code appended thereto, wherein one of the plurality of separate transmission units further has a composed message authentication code for the whole message appended thereto, and wherein a sender device appended the composed message authentication code to the one transmission unit prior to transmission over a network;

calculating a local sub-message authentication code for each transmission unit;

calculating a local composed message authentication code based on the local sub-message authentication codes for the plurality of separate transmission units;

comparing the local sub-message authentication code to the sub-message authentication code append to the plurality of separate transmission units to determine one or more of the integrity or authenticity of the associated transmission units; and comparing the local composed message authentication code to the composed message authentication code appended to the one of the plurality of separate transmitted units to determine the integrity and the authenticity of the whole message.

22. The method of claim 21, wherein the local sub-message authentication code is calculated as its transmission unit arrives.

23. The method of claim 21, wherein the transmission units arrive out of order.

24. The method of claim 21, further comprising:

buffering the transmission units as they are obtained.

25. The method of claim 21, further comprising:

providing the transmission units to other devices if the local composed message authentication codes and the composed message authentication code appended to the one of the plurality of separate transmitted units are the same.

26. The method of claim 21, further comprising:

discarding the transmission units if the local composed message authentication codes and the composed message authentication code appended to the one of the plurality of separate transmitted units are different.

27. A receiving device, comprising:

a receiver circuit configured to:

obtain a plurality of separate transmission units corresponding to a message, wherein each of the plurality of separate transmission units has a sub-message authentication code appended thereto, wherein one of the plurality of separate transmission units further has a composed message authentication code for the whole message appended thereto, and wherein a sender device appended the composed message authentication code to the one transmission unit prior to transmission over a network;

calculate a local sub-message authentication code for each transmission;

calculate a composed message authentication code based on the local sub-message authentication codes for the plurality of separate transmission units;

compare the local sub-message authentication codes to the sub-message authentication codes appended to the plurality of separate transmission units to determine one or more of the integrity or authenticity of the associated transmission units; and compare the local composed message authentication code to the composed message authentication code appended to the one of the plurality of separate transmitted units to determine the integrity and the authenticity of the whole message.

28. The device of claim 27, wherein the receiver is further configured to:

provide the transmission units to other devices if the local composed message authentication code and the composed message authentication code appended to the one of the plurality of separate transmitted units are the same; and discard the transmission units if the local composed message authentication code and the composed message authentication code appended to the one of the plurality of separate transmitted units are different.

29. A receiver device, comprising:

means for obtaining a plurality of separate transmission units corresponding to a message wherein each of the plurality of separate transmission units has a sub-message authentication code appended thereto, and wherein one of the plurality of separate transmission units further has a composed message authentication code for the whole message appended thereto, and wherein a sender device appended the composed message authentication code to the one transmission unit prior to transmission over a network;

means for calculating a local sub-message authentication code for each transmission unit;

means for calculating a composed message authentication code based on the local sub-message authentication codes for the plurality of separate transmission units;

means for comparing the local sub-message authentication codes to the sub-message authentication codes appended to the plurality of separate transmission units to determine one or more of the integrity or authenticity of the associated transmission units; and means for comparing the local composed message authentication code to the composed message authentication code appended to the one of the plurality of separate transmitted units to determine the integrity and the authenticity of the whole message.

30. The receiver device of claim 29, further comprising:

means for providing the transmission units to other devices if the local composed message authentication code and the composed message authentication code appended to the one of the plurality of separate transmitted units are the same; and means for discarding the message if the local composed message authentication code and the composed message authentication code appended to the one of the plurality of separate transmitted units are different.

31. A processing device comprising:

an input interface for receiving a plurality of transmission units corresponding to a message; wherein each of the plurality of separate transmission units has a sub-message authentication code appended thereto, wherein one of the plurality of separate transmission units further has a composed message authentication code for the whole message append thereto, and wherein a sender device appended the composed message authentication code to the one transmission unit prior to transmission over a network; and a processing circuit configured to:

calculate a local sub-message authentication code for each transmission unit;

calculate a composed message authentication code based on the local sub-message authentication codes for the plurality of separate transmission units;

compare the local sub-message authentication codes to a sub-message authentication codes appended to the plurality of separate transmission units to determine one or more of the integrity or authenticity of the associated transmission units; and compare the local composed message authentication code to the composed message authentication code appended to the one of the plurality of separate transmitted units to determine the integrity and the authenticity of the whole message.

32. The processing device of claim 31, wherein the processing circuit is further configured to:

provide the transmission units to other devices if the local and composed message authentication code and the composed message authentication code appended to the one of the plurality of separate transmitted units are the same; and discard the transmission units if the local composed message authentication code and the composed message authentication code appended to the one of the plurality of separate transmitted units are different.

33. A non-transitory machine-readable medium having one or more instructions for authenticating messages, which when executed by a processor causes the processor to:

obtain a plurality of separate transmission units corresponding to a message, wherein each of the plurality of separate transmission units has a sub-message authentication code appended thereto, wherein one of the plurality of separate transmission units further has a composed message authentication code for the whole message appended thereto, and wherein a sender device appended the composed message authentication code to the one transmission unit prior to transmission over a network;

calculate a local sub-message authentication code for each transmission unit;

calculate a composed message authentication code based on the local sub-message authentication codes for the plurality of separate transmission units;

compare the local sub-message authentication codes to the sub-message authentication codes appended to the plurality of separate transmission units to determine one or more of the integrity or authenticity of the associated transmission units; and compare the local composed message authentication code to the composed message authentication code appended to the one of the plurality of separate transmitted units to determine the integrity and the authenticity of the whole message.

34. The machine-readable medium of claim 33 further having one or more instructions which when executed by a processor causes the processor to further:

provide the transmission units to other devices if the local composed message authentication code and the composed message authentication code appended to the one of the plurality of separate transmitted units are the same; and discard the transmission units if the local composed message authentication code and the composed message authentication code appended to the one of the plurality of separate transmitted units are different.

* * * * *